United States Patent
Huo et al.

(10) Patent No.: US 7,808,940 B2
(45) Date of Patent: Oct. 5, 2010

(54) PEAK-TO-AVERAGE POWER RATIO CONTROL

(75) Inventors: David D. Huo, Newton, NJ (US); Farooq Ullah Khan, Monmouth, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 1033 days.

(21) Appl. No.: 10/842,713

(22) Filed: May 10, 2004

(65) Prior Publication Data
US 2005/0249110 A1    Nov. 10, 2005

(51) Int. Cl.
*H04B 7/00*    (2006.01)
*H04J 3/00*    (2006.01)

(52) U.S. Cl. .................... 370/310; 370/464

(58) Field of Classification Search ......... 370/203–209, 370/318, 342, 345, 347, 447, 465, 468, 310, 370/394, 464, 473, 474; 375/200, 206, 260; 714/750
See application file for complete search history.

(56) References Cited

U.S. PATENT DOCUMENTS

| | | | | |
|---|---|---|---|---|
| 5,704,003 | A * | 12/1997 | Kleijn et al. ............... | 704/220 |
| 5,799,013 | A * | 8/1998 | Seshadri et al. ............ | 370/342 |
| 6,549,564 | B1 * | 4/2003 | Popovic ...................... | 375/142 |
| 6,657,982 | B1 * | 12/2003 | Fong et al. .................. | 370/336 |
| 6,658,019 | B1 * | 12/2003 | Chen et al. .................. | 370/465 |
| 6,662,330 | B1 * | 12/2003 | Hershey ...................... | 714/748 |
| 6,754,277 | B1 * | 6/2004 | Heinzelman et al. ... | 375/240.27 |
| 6,947,408 | B1 * | 9/2005 | Liberti et al. .............. | 370/345 |
| 6,987,780 | B2 * | 1/2006 | Wei et al. ................... | 370/469 |
| 7,346,037 | B2 * | 3/2008 | Yun et al. ................... | 370/335 |
| 7,346,041 | B2 * | 3/2008 | Eklund et al. .............. | 370/343 |
| 7,385,944 | B2 * | 6/2008 | Kong et al. ................. | 370/328 |
| 2003/0174669 | A1 * | 9/2003 | Roh et al. ................... | 370/328 |
| 2004/0136314 | A1 * | 7/2004 | Jung et al. .................. | 370/203 |
| 2004/0136315 | A1 * | 7/2004 | Chang ........................ | 370/206 |
| 2004/0160893 | A1 * | 8/2004 | Park et al. .................. | 370/206 |
| 2004/0218533 | A1 * | 11/2004 | Kim et al. ................... | 370/235 |
| 2005/0058154 | A1 * | 3/2005 | Lee et al. .................... | 370/473 |
| 2005/0068908 | A1 * | 3/2005 | Qian et al. .................. | 370/278 |

(Continued)

FOREIGN PATENT DOCUMENTS

WO    WO 03/019791    *    3/2003

OTHER PUBLICATIONS

Hill G., Faulkner M., Singh J., "Cyclic Shifting and Time Inversion of Partial Transmit Sequences to Reduce the Peak-to-Average Power Ratio in OFDM", IEEE, Sep. 18-21, 2000, p. 1256-1259; retrieved on the internet on Aug. 25, 2008.*

(Continued)

*Primary Examiner*—Kevin C Harper
*Assistant Examiner*—Xavier Szewai Wong
(74) *Attorney, Agent, or Firm*—Williams, Morgan & Amerson (57) ABSTRACT

A method for reducing the peak-to-average power ratio (PAPR) in an OFDM based wireless system is disclosed herein. The reduced PAPR may be achieved by appropriately selecting subpackets for transmission. For example, a scheduler may elect to sequentially transmit the subpackets in an order related to the PAPR of each of the subpackets until at least one of the subpackets is properly received. In one embodiment of the instant invention the order of transmission is selected to be from lowest to highest PAPR.

14 Claims, 8 Drawing Sheets

U.S. PATENT DOCUMENTS

| | | | | |
|---|---|---|---|---|
| 2005/0068990 A1* | 3/2005 | Liu | | 370/516 |
| 2005/0237921 A1* | 10/2005 | Showmake | | 370/208 |
| 2006/0034378 A1* | 2/2006 | Lindskog et al. | | 375/260 |
| 2006/0141953 A1* | 6/2006 | Willenegger | | 455/102 |
| 2006/0182063 A1* | 8/2006 | Ma et al. | | 370/331 |
| 2007/0127407 A1* | 6/2007 | Attar et al. | | 370/318 |

OTHER PUBLICATIONS

International European Search Report (EP 05 25 2540) dated Aug. 24, 2005.

* cited by examiner

PEAK-TO-AVERAGE POWER RATIO CONTROL

BACKGROUND OF THE INVENTION

1. Field of the Invention

This invention relates generally to telecommunications, and more particularly, to wireless communications.

2. Description of the Related Art

Within wireless communications, a variety of transmission techniques are employed. Two relatively common techniques are Code Division Multiple Access (CDMA) and Orthogonal Frequency Division Multiplexing (OFDM). CDMA is a modulation and multiple access technique where multiple users employing different orthogonal Walsh codes can be multiplexed onto a common frequency carrier. CDMA has been used in various wireless communications systems due to its useful properties of interference averaging and multipath diversity. Those skilled in the art will appreciate that spreading the signals in a CDMA system provides sufficient processing gain to allow decoding transmissions received at very low Carrier-to-Interference ratio (C/I). Therefore, a CDMA transmission can withstand high levels of interference, allowing deployments with universal frequency reuse (same frequency used in all the sectors in the system). Examples of wireless communications systems that employ CDMA are second generation IS-95 systems and third generation cellular systems, such as UMTS (Universal Mobile Telecommunications System) and cdma2000. CDMA is also used in the IEEE 802.11b standard for wireless LANs (Local Area Networks).

In a CDMA downlink (base station to mobile station), the transmissions on different Walsh codes are orthogonal when they are received at the mobile station. This is due to the fact that the signal is transmitted from a fixed location (base station) on the downlink and all the Walsh codes are received synchronized. Therefore, in the absence of multipath signals, transmissions on different codes do not interfere with each other. However, in the presence of multipath propagation (typical of cellular environments), the Walsh codes are no longer orthogonal, and thus, interfere with each other, producing Inter-Symbol Interference (ISI) and Multiple Access Interference (MAI). ISI and MAI limit the maximum achievable Signal-to-Noise Ratio (SNR), thereby limiting the maximum data rate that may be supported.

The problem is also present on a CDMA uplink (mobile station to base station) because the received Walsh codes from multiple users are not orthogonal even in the absence of any multipath signals. In the uplink, the propagation times from mobiles at different locations to the base station are often different. The received codes are not synchronized when they arrive at the base station, and therefore orthogonality cannot be guaranteed for signals coming from different mobiles. Transmissions from multiple users interfere with each other, generating Multiple Access Interference (MAI) and therefore contributing to the noise rise seen by each of the users. In general, the noise rise at the base station is kept below a certain threshold called the rise-over-thermal (RoT) threshold in order to guarantee desirable system capacity and coverage. The circuitry of the base station generates a certain amount of temperature dependent noise called thermal noise. The RoT threshold limits the amount of power above the thermal noise at which mobiles transmissions can be received. The threshold, along with interference from other users, limits the achievable data rates and capacity for transmissions on the CDMA uplink.

OFDM does not suffer some of the problems associated with CDMA. For example, ISI is substantially reduced by using longer symbol durations in OFDM. Moreover, the transmissions occur on orthogonal subcarriers without generating any Multiple Access Interference (MAI). In an OFDM system, a high data rate stream is converted from parallel to serial, resulting in a lower rate on each of the parallel streams. A lower rate on each of the streams allows using longer symbol duration. The multiple parallel data streams are mapped to orthogonal subcarriers in OFDM. The OFDM modulation efficiently uses the radio spectrum by placing modulated subcarriers as close as possible without causing Inter-Carrier Interference (ICI). Owing, at least in part, to its superior performance, OFDM modulation has been adopted in various standards, most notably digital audio broadcast (DAB), digital video broadcast (DVB), asymmetric digital subscriber line (ADSL), IEEE LAN (802.11a and 802.11g) and IEEE MAN 802.16a. OFDM modulation is also being considered for various next generation wireless standards.

While OFDM provides some benefits over CDMA, an OFDM signal suffers from its own shortcomings. For example, an OFDM signal has a higher peak-to-average power ratio (PAPR), which requires more expensive power amplifiers with large dynamic ranges. In the absence of these expensive power amplifiers, the OFDM signal may be clipped with a high probability that Bit Error Rate (BER) and/or Frame error Rate (FER) performance will be degraded. The clipping may also lead to intermodulation products among the subcarriers and disturbing out of band energy.

The present invention is directed to overcoming, or at least reducing, the effects of, one or more of the problems set forth above.

SUMMARY OF THE INVENTION

In one embodiment of the present invention, a method is provided for transmitting information. The method comprises forming a first and second subpacket from the information, and determining a peak-to-average power ratio for the first and second subpackets. At least one of the first and second subpackets is then transmitted in an order related to the peak-to-average power ratio of each subpacket.

In another embodiment of the present invention, a method is provided for transmitting information. The method comprises forming a plurality of subpackets from the information, and determining a peak-to-average power ratio for at least a portion of the plurality of subpackets. At least one of the plurality of subpackets is then transmitted in an order related to the peak-to-average power ratio of each subpacket.

BRIEF DESCRIPTION OF THE DRAWINGS

The invention may be understood by reference to the following description taken in conjunction with the accompanying drawings, in which like reference numerals identify like elements, and in which.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Generally, a method for reducing the peak-to-average power ratio (PAPR) in an OFDM based wireless system is disclosed herein. The reduced PAPR may be achieved in one embodiment of the instant invention by appropriately selecting subpackets (for transmission) available in a system using a Hybrid ARQ.

Figure 1:
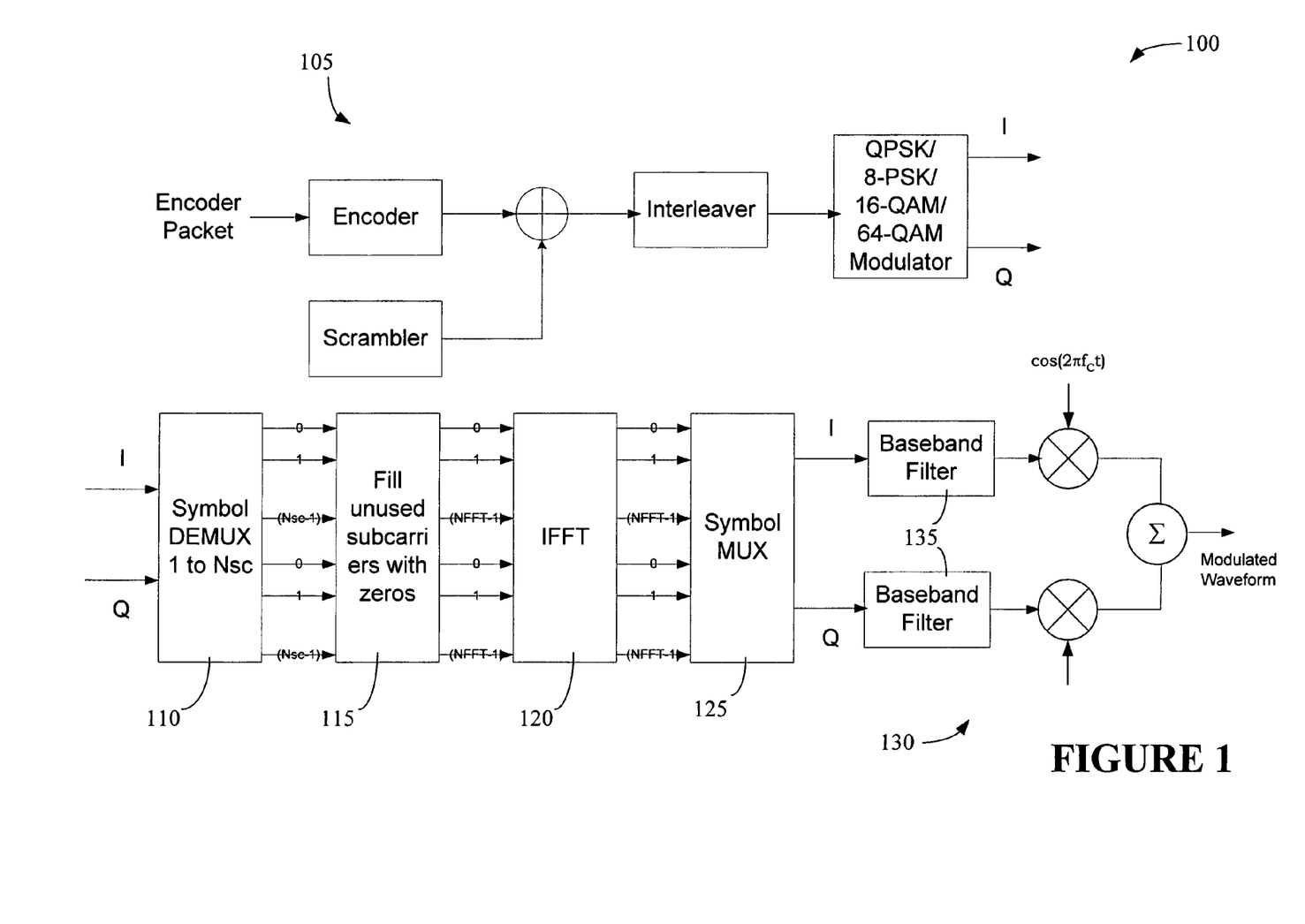
FIG. 1 illustrates a stylized representation of an OFDM transmitter chain.

Turning now to the drawings, and in particular to FIG. 1, a stylized representation of a conventional OFDM transmitter chain 100 is shown. Generally, information in the form of a set of bits called an encoder packet is coded, interleaved and modulated into Q symbols and I symbols by hardware/software/firmware 105. Those skilled in the art will appreciate that the information can take on a wide variety of forms, including but not limited to control information, data, timing, power, and the like, and may be of the type useful in a wide variety of applications, such as cellular communications, network communications, VoIP, 802.11 type communications and the like.

A group of the I and Q symbols are serial-to-parallel converted by a de-multiplexer 110 and mapped to available subcarriers. Unused subcarriers are filled with zeros, and thus, carry no symbols, as stylistically represented at 115. At 120 an IFFT (Inverse Fast Fourier Transform) operation is performed on the subcarrier symbols and the resulting symbols are parallel-to-serial converted by a multiplexer 125 to form a time-domain signal that is quadrature modulated and converted to an RF frequency for transmission by hardware/software/firmware 130. In some embodiments of the OFDM transmitter chain 100, a baseband filter 135 may be employed prior to converting to the RF frequency.

Generally, a higher PAPR may result from several parallel transmissions on the same communications channel. For example, a high PAPR in a CDMA system results from parallel transmission over multiple Walsh codes. In an OFDM system, a high PAPR is the result of parallel transmission on several subcarriers.

Figure 2:
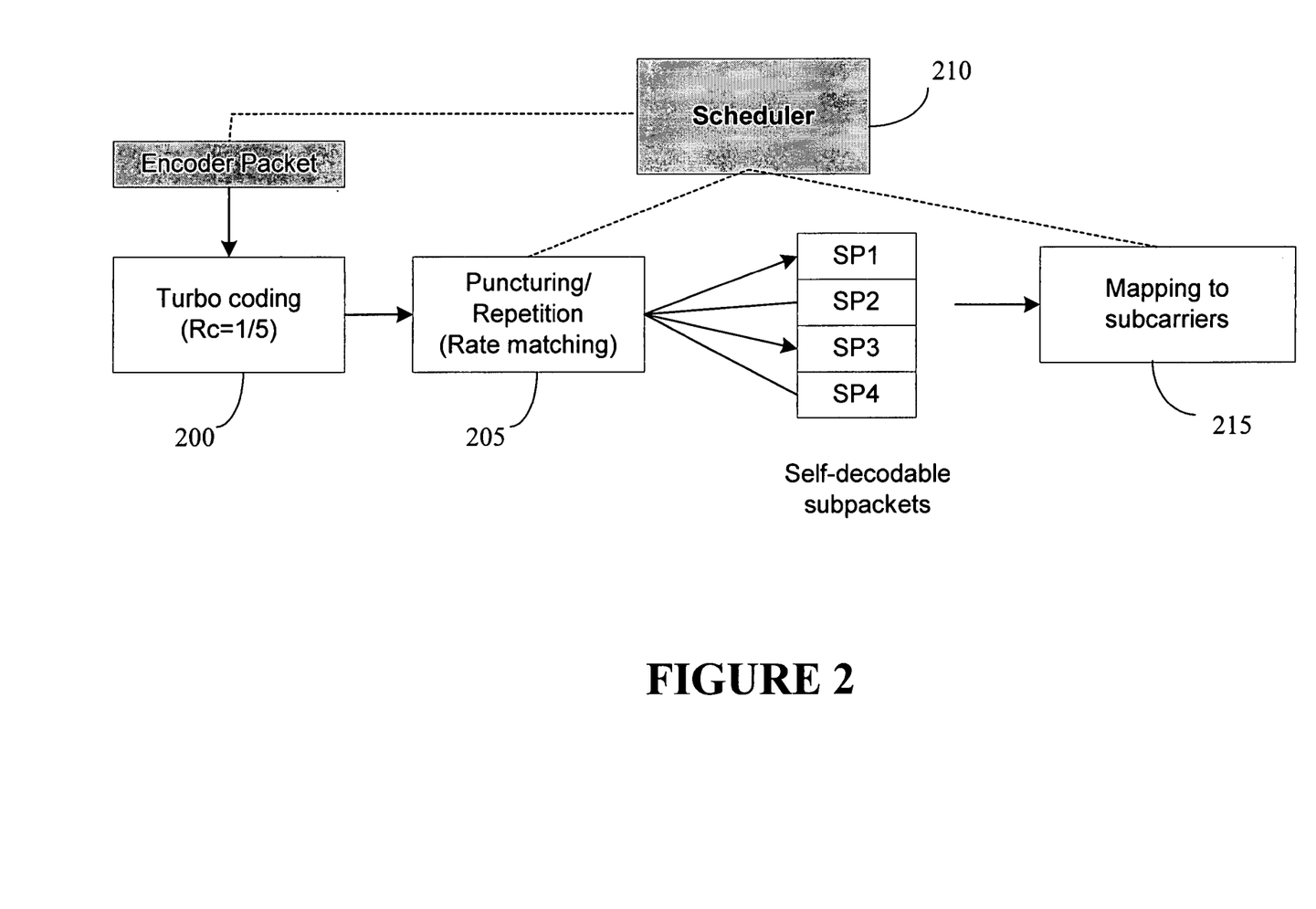
FIG. 2 illustrates an exemplary technique for forming subpackets in a Hybrid ARQ system.

Turning now to FIG. 2, one exemplary technique for forming subpackets from the encoder packet in a Hybrid ARQ system is shown. An information packet, referred to herein as the encoder packet, is provided as an input signal to a channel encoder 200. In an exemplary embodiment of the instant invention, the channel encoder 200 may employ turbo coding with rate ⅕ code. The channel encoder 200 adds redundancy to the information providing capability to correct errors at the receiver. A sequence of coded bits provided by the encoder 200 is punctured and/or repeated at 205 to form subpackets, such as subpackets SP1-SP4. Those skilled in the art will appreciate that the number of subpackets formed are a function of design criteria and depends, among other factors, upon the base coding rate and the maximum number of retransmission attempts allowed in the Hybrid ARQ process. In an exemplary embodiment of the instant invention, the four subpackets formed from the information packet are each self-decodable, i. e. the information packet (encoder packet) can potentially be recovered from any single one of the subpackets. However, the principles of the present invention can readily be applied to the case of non self-decodable subpackets.

The subpackets SP1-SP4 may then be routed or mapped to appropriate subcarriers under the control of a scheduler 210, as illustrated at 215. By controlling the mapping of the subpackets SP1-SP4 PAPR may be substantially reduced.

Figure 3:
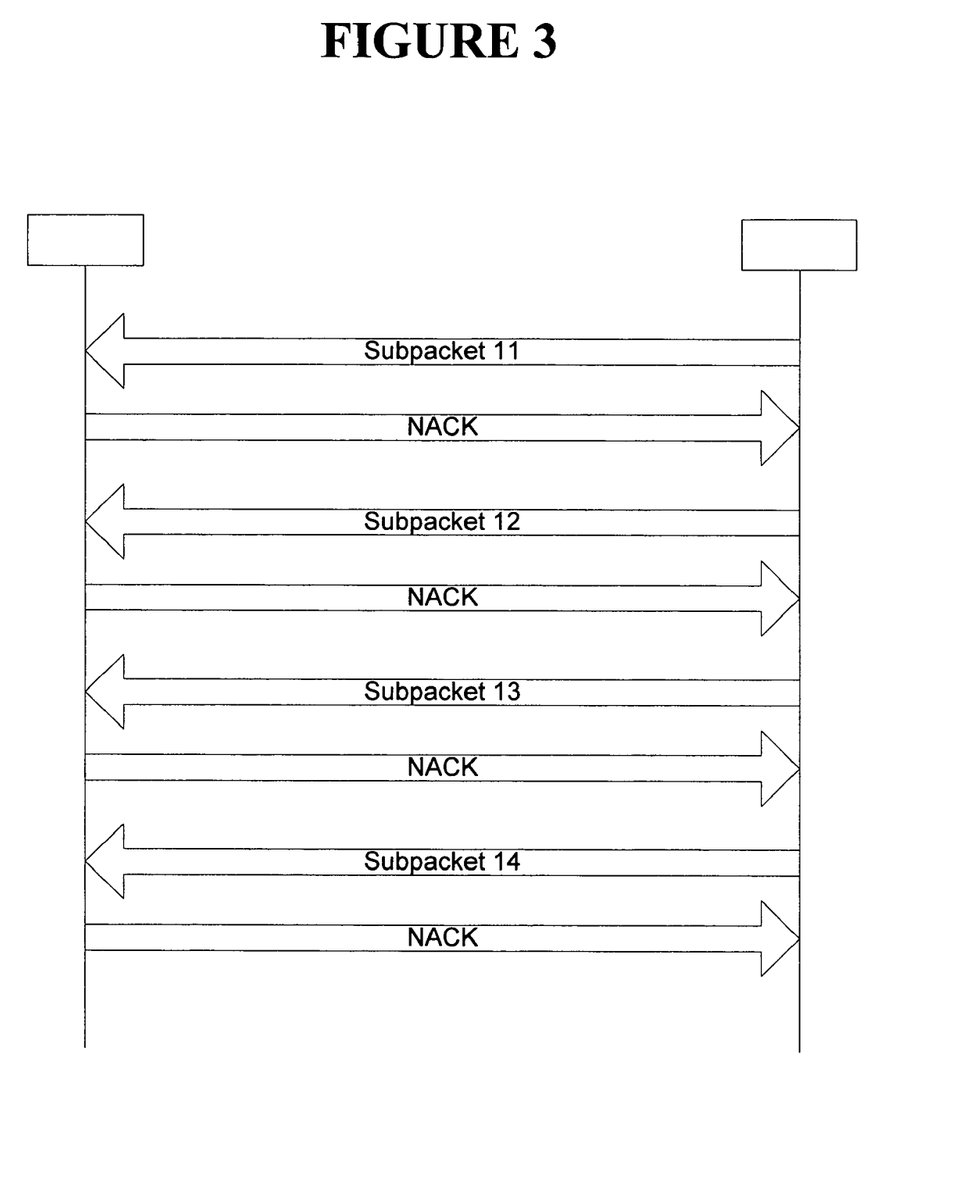
FIG. 3 illustrates a stylized representation of one embodiment of a technique for controlling the transmission of subpackets in a Hybrid ARQ operation.
Figure 4:
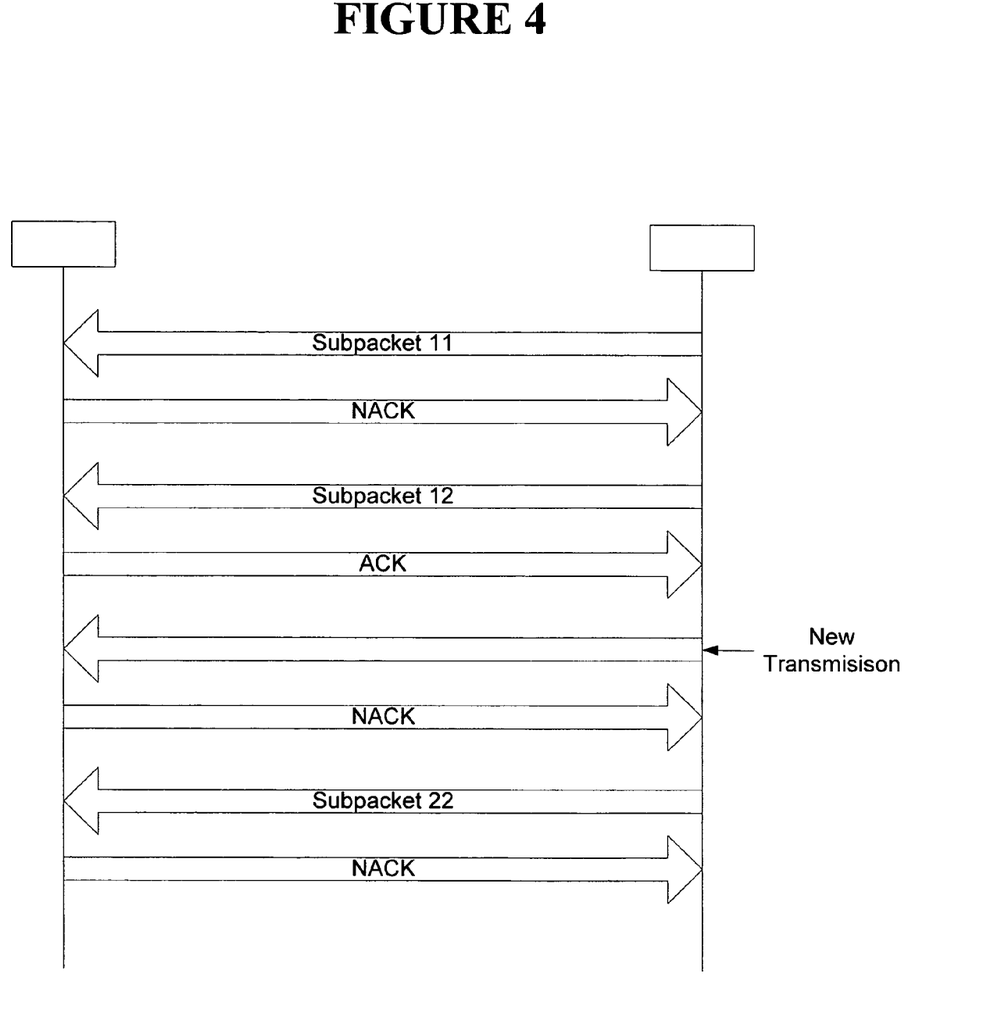
FIG. 4 illustrates a stylized representation of one embodiment of a technique for transmitting subpackets in a Hybrid ARQ operation.

A stylized representation of an exemplary Hybrid ARQ operation is depicted in FIGS. 3 and 4. In FIG. 3, all four of the subpackets SP1-SP4 derived from an encoder packet are sequentially transmitted, each in response to receiving a non-acknowledgement (NACK) feedback signal from the receiver in response to the subpacket transmission not being properly received. In FIG. 4, the first encoder packet succeeds after transmission of two subpackets, as indicated by the transmission of the ACK signal after properly receiving the subpacket S2. The base station then starts transmission of a new encoder packet after receiving an ACK response for the previous encoder packet. In prior systems, the subpackets are transmitted in a predetermined sequence, i.e. subpacket S1, followed by subpacket S2, S3 and S4 etc.

Those skilled in the art will appreciate that each subpacket normally contains a different set of coded bits, and therefore, normally produces a different PAPR ratio when transmitted, e.g. using multiple Walsh codes in CDMA or multiple subcarriers in an OFDM system. Since multiple subpackets are available for decoding of the same encoder packet, it is possible to control the PAPR by appropriately selecting the subpackets for transmission at a given time. That is, the scheduler 210 may elect to deviate from the conventional order of subpacket S1, followed by subpacket S2, S3 and S4, and instead select the subpackets in an order that proceeds from lowest to highest PAPR.

Figure 5:
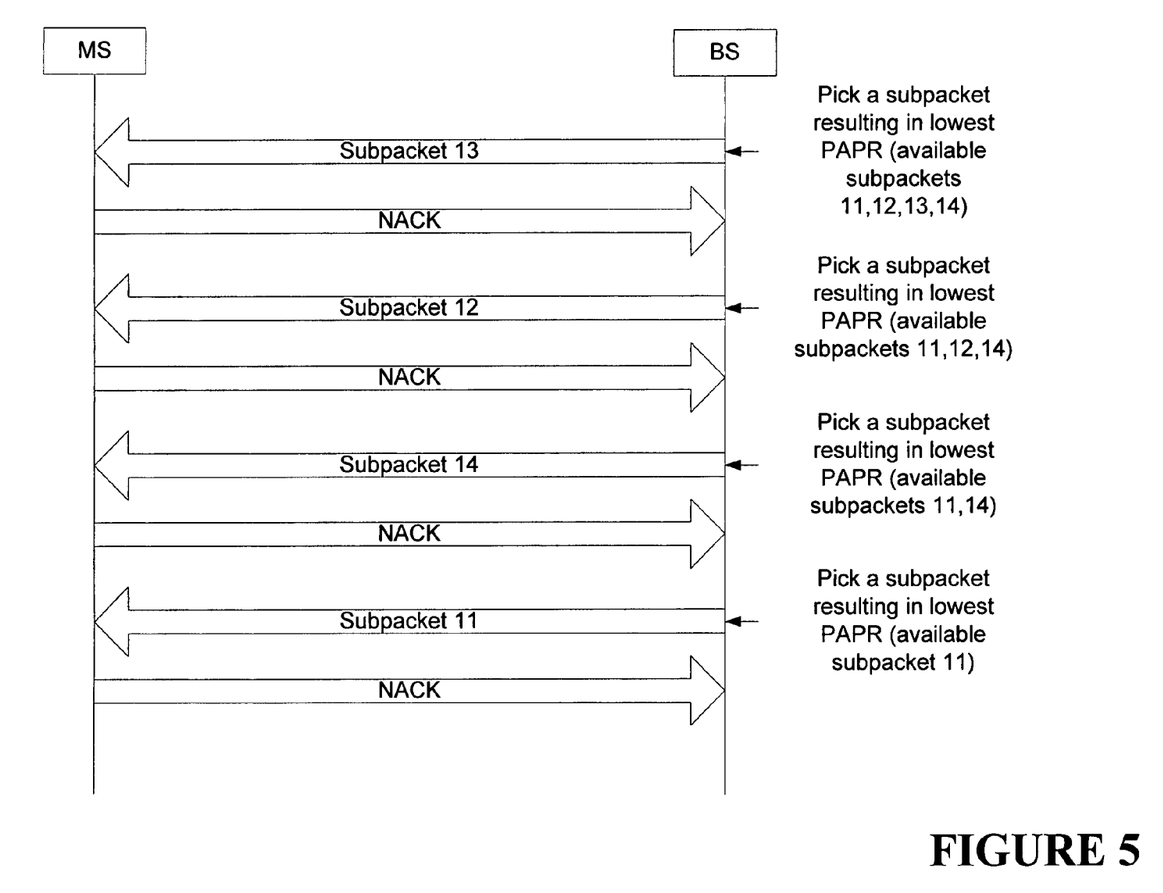
FIG. 5 illustrates a stylized representation of one embodiment of a technique for transmitting subpackets in a Hybrid ARQ operation.

An example of Hybrid ARQ operation according to the principles of present invention is shown in FIG. 5. There is no predetermined sequence for transmission of the subpackets. For transmission of a given encoder packet, a subpacket resulting in the lowest PAPR is selected for transmission (e.g., subpacket S3, the third subpacket from the first encoder packet in FIG. 3). If the transmission is not successful (e.g., a NACK response is received), the subpacket with the next lowest PAPR is selected for transmission (subpacket S2, the second subpacket from the first encoder packet in FIG. 3). The transmission of subpackets using this principle avoids transmission of subpackets resulting in the higher PAPR in most of the cases. This is due to the fact that the likelihood of successful decoding in a first and second Hybrid ARQ attempt is in general higher than the success in the later attempts. Since the subpackets may potentially be transmitted out-of-sequence, the subpacket sequence numbers may be explicitly signaled to the receiver.

Figure 6:
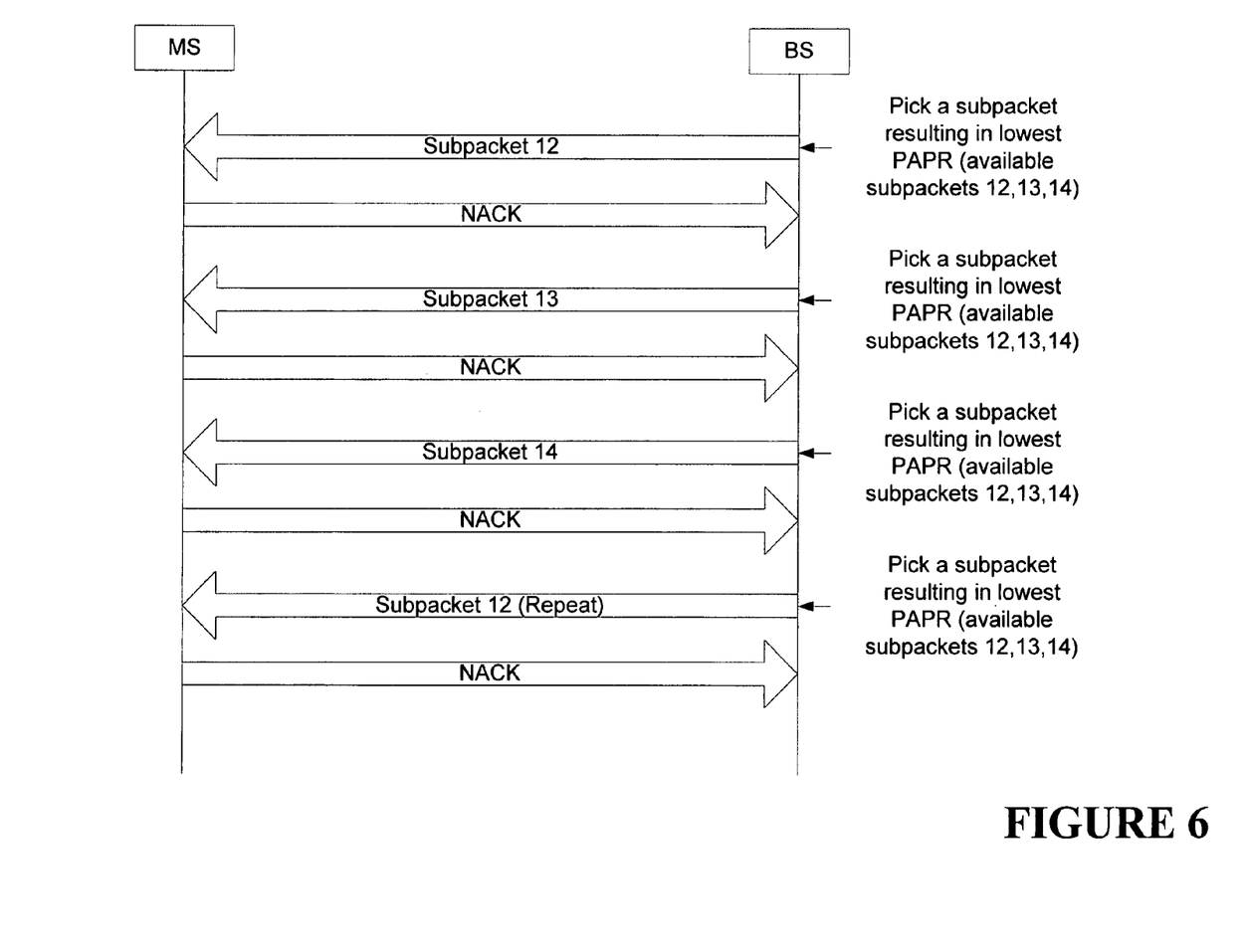
FIG. 6 illustrates a stylized representation of one embodiment of a technique for transmitting subpackets in a Hybrid ARQ operation.

According to another embodiment of the present invention, subpackets that exceed a predefined PAPR threshold criterion are eliminated from the list of transmittable subpackets, as shown in FIG. 6. In this example, Subpacket S1 violated the PAPR criteria and is eliminated from potential transmission. The remaining subpackets S2-S3 can then be transmitted in a desired sequence, such as the sequence set forth in conjunction with FIG. 5. In order to allow a larger number of Hybrid ARQ transmission attempts, subpacket transmission can potentially be repeated. For example, subpacket S2 is repeated in the example of FIG. 6 after receiving the third NACK from the receiver.

Figure 7:
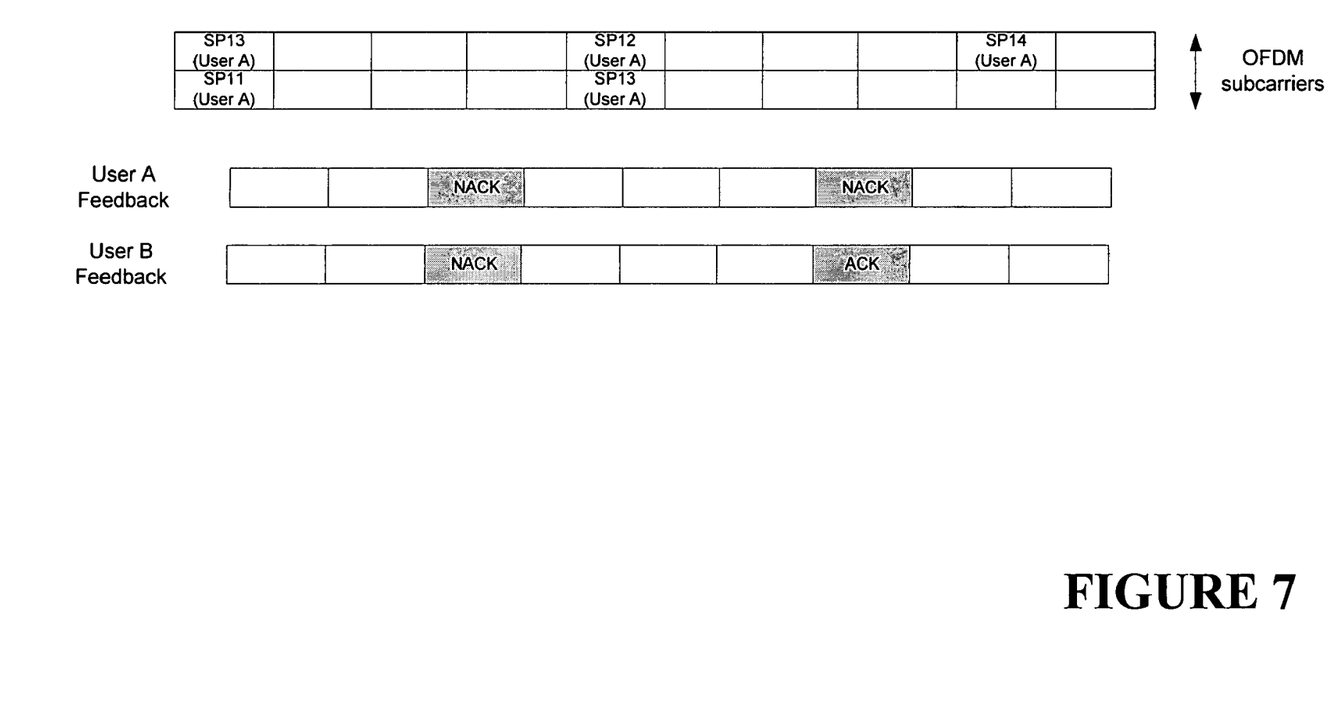
FIG. 7 illustrates a stylized representation of one embodiment of a technique for transmitting subpackets in a Hybrid ARQ operation.

According to another embodiment of the present invention, subpackets from more than one user are selected for simultaneous transmissions as shown in FIG. 7. In this case the PAPR applies to the overall signal generated from simultaneous transmission of subpackets from multiple users. Therefore, the subpackets from each of the users are selected such that the PAPR criterion is satisfied.

In the example shown in FIG. 7, subpacket S3 is selected from user A and subpacket S1 from user B in the first attempt. In the second attempt subpacket S2 is selected from user A and subpacket S3 from user B. User B's encoder packet transmission succeeds after 2 attempts. Therefore, in the third attempt, subpacket S4 is selected from user A. note that the PAPR criterion applies to the transmission from user A only when there is no other user transmitting.

Figure 8:
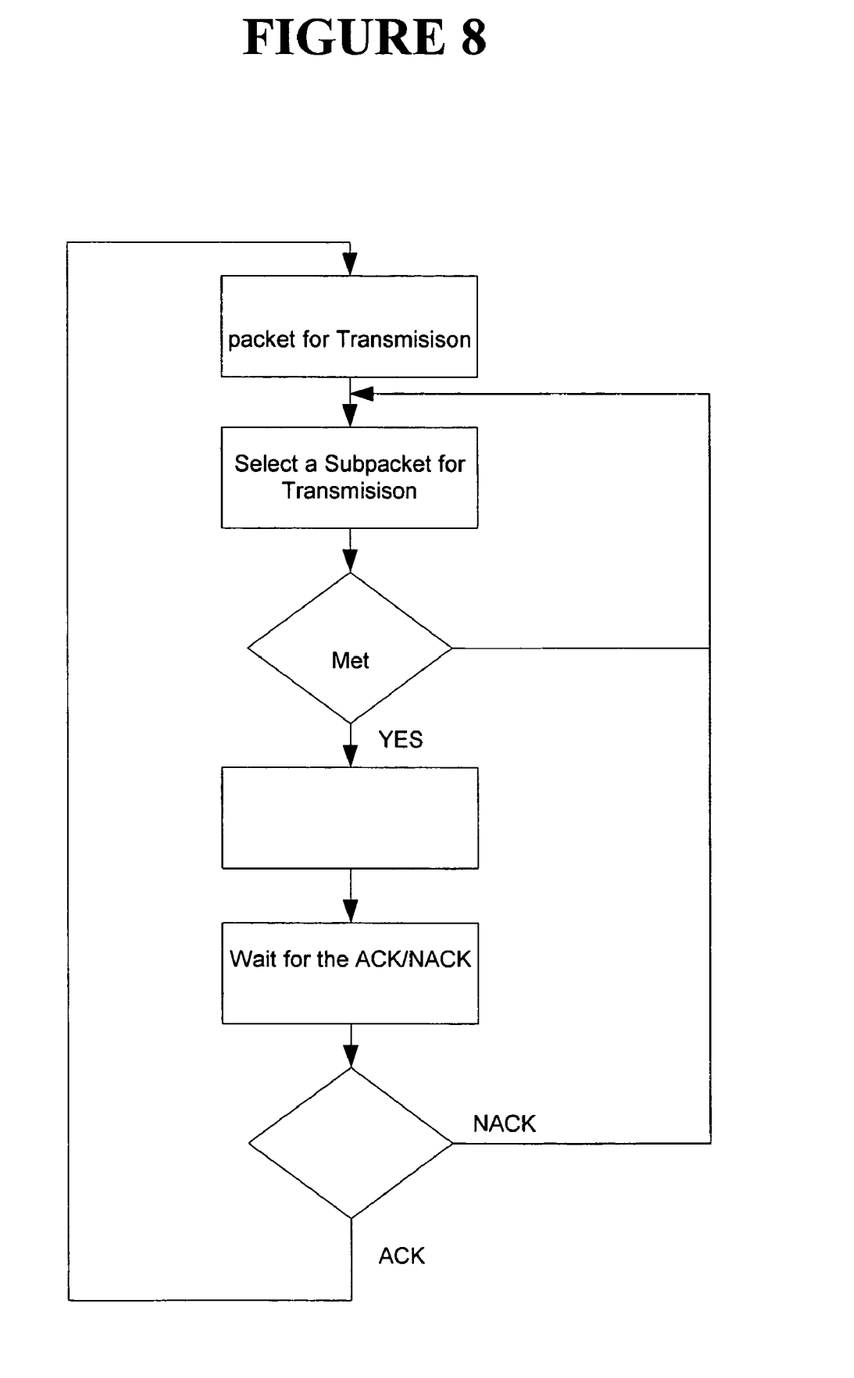
FIG. 8 illustrates one embodiment of a software routine that may be employed to control the transmission of subpackets in a Hybrid ARQ operation.

An exemplary flow chart depicting one embodiment of a selection process for subpackets for PAPR control is set forth in FIG. 8. The process begins at block 800 with the selection of a new encoder packet for transmission. At block 805, a subpacket associated with the new encoder packet is selected. If, at block 810, the selected subpacket does not meet an established PAPR criteria (e.g., the selected subpacket has a PAPR that exceeds a preselected threshold), then control returns to block 805 where another subpacket is selected and the process repeats. On the other hand, if the selected subpacket meets the PAPR criteria, then the subpacket is transmitted to the receiver (which may be either the base station or the mobile unit, depending upon the direction of the transmission) at block 815. At block 820, the transmitter waits for ACK/NACK signal from the receiver, indicating that the subpacket was/was not properly received. If the subpacket was not properly received, as indicated by the receipt of a NACK signal, then block 825 transfers control back to block 805 where another subpacket is selected and the process is repeated. On the other hand, if the subpacket was properly received, as indicated by the receipt of an ACK signal, then block 825 transfers control back to block 800 where another new encoder packet is selected and the process repeats.

A technique for peak-to-average power ratio (PAPR) control in a communications system is disclosed. The proposed scheme selects a set of Hybrid ARQ subpackets that results in the lowest PAPR for transmission at a given time. In alternative embodiments of the instant invention, it may be useful to select subpackets that fall below a preselected PAPR but do not necessarily result in the lowest PAPR. That is, a pool of subpackets having an acceptable PAPR may be established, and then the scheduler may select randomly from that pool, resorting to subpackets not contained in the pool only once the pool is exhausted.

Those skilled in the art will appreciate that the various system layers, routines, or modules illustrated in the various embodiments herein may be executable control units (such as scheduler 210 (see FIG. 2)). The control units may include a microprocessor, a microcontroller, a digital signal processor, a processor card (including one or more microprocessors or controllers), or other control or computing devices as well as executable instructions contained within one or more storage devices. The storage devices may include one or more machine-readable storage media for storing data and instructions. The storage media may include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy, removable disks; other magnetic media including tape; and optical media such as compact disks (CDs) or digital video disks (DVDs). Instructions that make up the various software layers, routines, or modules in the various systems may be stored in respective storage devices. The instructions, when executed by a respective control unit, cause the corresponding system to perform programmed acts.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

We claim:

1. A method of transmitting information included in an encoded packet, the method comprising:

forming, at a base station, a first and second subpacket from the encoded packet such that decoding at least one of the first and second subpackets recovers the information included in the encoded packet;

determining, at the base station, a peak-to-average power ratio for each of the first and second subpackets; and transmitting, from the base station, at least one of the first and second subpackets using a hybrid automatic repeat request protocol, wherein the first or second subpacket is selected for transmission in an order related to the peak-to-average power ratio of each subpacket, wherein transmitting at least one of the first and second subpackets in an order related to the peak-to-average power ratio of each subpacket further comprises transmitting the subpacket having the lowest peak-to-average power ratio first, and transmitting the subpacket having a higher peak-to-average ratio second in response to receiving a signal that the subpacket having the lowest peak-to-average power ratio was not received properly;

forming, at the base station, a third and fourth subpacket from a subsequent set of information in response to receiving a signal indicating that at least one of the first and second subpackets was received properly;

determining, at the base station, a peak-to-average power ratio for each of the third and fourth subpackets; and transmitting, from the base station, at least one of the third and fourth subpackets in an order related to the peak-to-average power ratio of each subpacket.

2. A method of transmitting information included in an encoded packet, the method comprising:
- forming, at a base station, a first and second subpacket from the encoded packet such that decoding at least one of the first and second subpackets recovers the information included in the encoded packet;
- determining, at the base station, a peak-to-average power ratio for each of the first and second subpackets; and
- transmitting, from the base station, at least one of the first and second subpackets using a hybrid automatic repeat request protocol, wherein the first or second subpacket is selected for transmission in an order related to the peak-to-average power ratio of each subpacket.

3. A method, as set forth in claim 2, wherein transmitting at least one of the first and second subpackets in an order related to the peak-to-average power ratio of each subpacket further comprises transmitting the subpacket having the lowest peak-to-average power ratio first.

4. A method, as set forth in claim 2, wherein transmitting at least one of the first and second subpackets in an order related to the peak-to-average power ratio of each subpacket further comprises transmitting the subpacket having the lowest peak-to-average power ratio first, and transmitting the subpacket having a higher peak-to-average ratio second in response to receiving a signal that the subpacket having the lowest peak-to-average power ratio was not received properly.

5. A method, as set forth in claim 2, wherein forming a first and second subpacket from the information further comprises forming a first and second self-decodable subpacket from the information, wherein decoding either the first or second self-decodable subpacket recovers the information included in the encoded packet.

6. A method of transmitting information included in an encoded packet, the method comprising:
- forming, at a base station, a plurality of subpackets from the encoded packet such that decoding at least one of the subpackets recovers the information included in the encoded packet;
- determining, at the base station, a peak-to-average power ratio for at least a portion of the plurality of subpackets; and
- transmitting, from the base station, the plurality of subpackets according to a hybrid automatic repeat request protocol, wherein the plurality of subpackets are transmitted in an order related to the peak-to-average power ratio of each subpacket.

7. A method, as set forth in claim 6, wherein transmitting at least one of the plurality of subpackets in an order related to the peak-to-average power ratio of each subpacket further comprises transmitting the subpacket having the lowest peak-to-average power ratio first.

8. A method, as set forth in claim 6, wherein transmitting at least one of the plurality of subpackets in an order related to the peak-to-average power ratio of each subpacket further comprises transmitting the subpacket having the lowest peak-to-average power ratio first, and transmitting the subpacket having the next lowest peak-to-average ratio thereafter in response to receiving a signal that the subpacket having the lowest peak-to-average power ratio was not received properly.

9. A method, as set forth in claim 6, wherein transmitting at least one of the plurality of subpackets in an order related to the peak-to-average power ratio of each subpacket further comprises sequentially transmitting each of the subpackets in an order of lowest to highest peak-to-average power ratio until receiving a signal that at least one of the subpackets was properly received.

10. A method, as set forth in claim 6, wherein transmitting at least one of the plurality of subpackets in an order related to the peak-to-average power ratio of each subpacket further comprises:
- selecting a first subpacket; and
- transmitting the first subpacket in response to the peak-to-average power ratio of the selected subpacket being less than a preselected setpoint.

11. A method, as set forth in claim 10, further comprising:
- selecting a second subpacket in response to receiving a signal that the first subpacket was not properly received; and
- transmitting the second subpacket in response to the peak-to-average power ratio of the selected subpacket being less than a preselected setpoint.

12. The method of claim 6, wherein, forming the plurality of subpackets comprises forming a plurality of self-decodable packets such that decoding any one of the self-decodable subpackets or any combination of the self-decodable subpackets recovers the information included in the encoded packet.

13. A method of receiving information included in an encoded packet, the method comprising:
- receiving, at a mobile unit, at least one of a first and second subpacket transmitted by a base station according to a hybrid automatic repeat request protocol, the first and second subpackets being received in an order related to a determined peak-to-average power ratio for each of the subpackets, each subpacket being formed from the encoded packet such that decoding at least one of the first and second subpackets recovers the information included in the encoded packet.

14. A method of transmitting information included in an encoded packet, the method comprising:
- transmitting, from a base station, at least one of a first and second subpacket according to a hybrid automatic repeat request protocol, wherein the first and second subpacket are transmitted in an order related to a determined peak-to-average power ratio for each of the subpackets, each subpacket being formed from the encoded packet such that decoding at least one of the first and second subpackets recovers the information included in the encoded packet.

* * * * *